Sept. 6, 1966     W. C. STONE     3,270,766
AUTOMATICALLY VISCOUS SEALED FLUID AMPLIFIER
Filed Sept. 18, 1963

William C. Stone,
INVENTOR.

BY Harry M. Saragovitz
Edward J. Kelly
Herbert Berl
Harold W. Hilton

United States Patent Office 3,270,766
Patented Sept. 6, 1966

3,270,766
AUTOMATICALLY VISCOUS SEALED FLUID AMPLIFIER
William C. Stone, 1901 Alexander Drive SE.,
Huntsville, Ala.
Filed Sept. 18, 1963, Ser. No. 309,904
8 Claims. (Cl. 137—246.22)

This invention pertains to fluid amplifiers and more particularly to a fluid amplifier having a sealing means which automatically replaces itself responsive to erosion thereof as a result of extreme temperatures and pressures.

The amplifier of the present invention may be used in rocket propulsion systems to achieve thrust vectoring. It is well known that injections of fluids into the exit cone of a rocket motor nozzle is one method of producing a side thrust and thereby achieving thrust vectoring. However, experiments have shown that the injection of hot chamber gases into the exit cone gives the highest impulse, that is, thrust per unit mass flow. This method saves the weight of an additional gas generating system, but introduces the requirement for a fluid amplifier which will operate reliably in the hot gas environment of the combustion chamber gases. The erosive atmosphere of solid propellant combustion gases results in a severe design problem in developing a fluid amplifier which will give reliable service. The most critical part of the fluid amplifier is the positive and reliable sealing off of the gas flow in the valve seat.

Prior art designs used either hard or soft seats. Hard seats erode excessively and allow gas leakage, while soft seats seal reasonably well, but are burdened by a displacement problem since a piston is required to seal against the seat and the piston actually burns into the seat.

The fluid amplifier of the present invention overcomes these problems by employing a regenerative seal which is pumped into place upon each closing of the valve.

Accordingly, it is an object of this invention to provide a fluid amplifier which will operate reliably in the hot gas environment of the combustion chamber gases.

Further it is an object of the present invention to provide a fluid amplifier which gives positive sealing in the environment of the combustion chamber gases.

Yet another object of the instant invention is to provide an improved fluid amplifier with a regenerative seal which gives positive sealing in the environment of the combustion chamber gases.

A further object of the invention is to provide a fluid amplifier which resists erosion caused by the combustion chamber gases.

Figure 1:
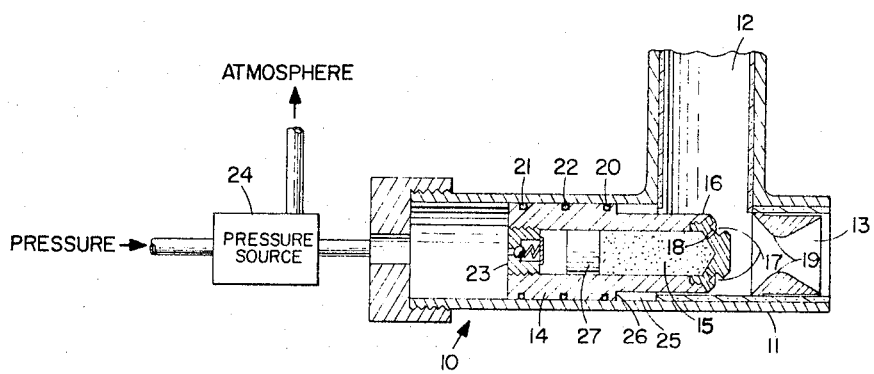
Figure 2:
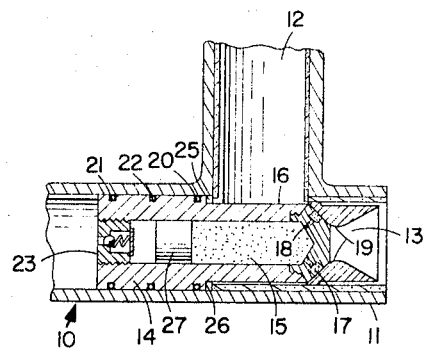

These and other objects, features, and advantages of the present invention will become evident to one skilled in the art from the following detailed description taken in conjunction with the accompanying drawings, in which:

FIGURE 1 is an elevational view in section of the fluid amplifier in the open position; and FIGURE 2 is an elevational view in section of the fluid amplifier in the closed position.

As shown in FIGURE 1 the fluid amplifier 10 includes a cylinder section 11 with an inlet 12 and an exit 13. A hollow piston 14 is slidably mated with said cylinder section. The hollow piston carries a viscous seal means 15 and a floating piston 27. The male seat 16 has an O ring groove 17 communicating with viscous sealant 15 through passages 18. The hollow piston 14 has a pair of piston rings 20 in the same groove and two O rings 21 and 22 circumferentially mounted thereon to prevent communication of the hot gases and the pressure source. A check valve 23 is carried in the piston 14 to prevent the backflow of the pressurant acting against the floating piston 27. The exit 13 contains a restriction 19 forming a female seat. The pressure source 24 is in communication with said hollow piston in a manner as to force the male seat of the piston to mate with the female seat and at the same time force the viscous sealant through passages 18 into the O ring groove 17 forming a seal between the seats.

In operation hot gases enter the cylinder at 12 and leave at 13. In order to stop this flow the pressure source 24 is opened. The gas from the source acts on the hollow piston 14 forcing the male end of the piston 16 to move against the female seat 19. At the same time the gas passes through the check valve 23 contacting the floating piston 27 and forcing the viscous sealant 15 through the passages 18 into the O ring groove 17. This viscous sealant flows into place and forms a seal between the male and female seats. While the valve is closed the hot gases are prevented from communicating with the pressure source by piston rings 20 and O rings 21 and 22. To open the valve, the pressure source is closed and the pressurant is vented to the atmosphere. The pressure of the hot gas on the hollow piston is now greater than the pressure from the source and the pressure in chamber 25 exerts a force on annular shoulder 26 of the piston to force the piston back thus allowing the hot gas to pass out at 13 once again. The check valve 23 prevents the hot gas pressure from forcing the pressurant between said check valve and the floating piston back into the pressure source and thus relieving the continuous pressure on the sealant.

The pressure source can be controlled by any means suitable to the use of the valve. One means of operation is a three-way electric valve connected directly to the hot gas amplifier and energized by a cam-operated microswitch and power supply. However, any convenient valve may be used and many variations may be apparent to one skilled in the art.

The gas used in the pressure source is not critical. The only considerations would be those of safety and economy. Nitrogen gas was readily available to this invention and so it was employed in the pressure source. It is also feasible to use mechanical means to accomplish the same purpose.

Molybdenum may be used in the construction of the seat parts of the fluid amplifier but the choice of material is not limited. The rest of the amplifier may be constructed of stainless steel with asbestos reinforced phenolic resin insulation for protection from excessive heating and erosion. These materials may be changed by anyone skilled in the art without deviating from the spirit and scope of this invention.

The fluid amplifier is primarily designed for the injection of fluids into the exit cone of a rocket motor nozzle, but it may be employed anywhere a positive seal is required. It is to be understood that the descriptive material and drawings employed herein are intended for purposes of exemplifying the invention and are not to be interpreted as limitative thereof. Accordingly, numerous additional embodiments of the invention will occur to those skilled in the art without departing from the spirit and scope of the present invention as defined in the appended claims.

I claim:
1. A value disposed for controlling the flow of hot gases therethrough comprising:
  (a) a housing having a longitudinal bore therethrough including an exit portion at a first end of said bore and an inlet disposed in normal relation to and in communication with said bore;
  (b) a hollow piston slideably mounted in said bore and having a male seat thereon for sealing engagement with said exit portions, said hollow piston provided with a chamber containing a viscous seal means, and said seat of said hollow piston having passage means therethrough and in communication with said piston chamber;
(c) a floating piston concentrically carried in said hollow piston chamber to effect flow of said viscous seal means through said passage means;
(d) a pressure source secured to a second end of said bore in communiaction with said hollow piston and said floating piston for causing relative movement therebetween, whereby said seat of said hollow piston is moved into sealing engagement with said exit portion of said housing and movement of said floating piston effects extrusion of said viscous seal means through said passage means for retention between said seat and said exit portion to enhance the seal therebetween for preventing flow of the hot gases through said exit portion.

2. A valve as in claim 1 including:
(a) an annular O ring groove disposed about the outer periphery of said male seat for retention of said viscous seal means therein responsive to said extrusion;
(b) said passage means including a plurality of annularly disposed ports communicating with said piston chamber and said O ring groove for carrying said viscous seal means thereto.

3. A valve as in claim 2 wherein said exit portion of said housing is provided with a restriction to form a female seat for mating engagement with said male seat.

4. The valve of claim 1 wherein said piston has a plurality of annular seal means circumferentially mounted thereon to prevent communication of hot gases with said pressure source.

5. The valve of claim 1 including a check valve mounted in said piston at one end thereof and disposed to prevent the loss of the pressurant between the check valve and the floating piston thus relieving the continuous pressure on the sealant.

6. The valve of claim 1 wherein said pressure source is nitrogen gas.

7. The valve of claim 1 wherein said viscous seal means is zinc chromate putty.

8. The valve of claim 1 wherein said male seat and said restriction are made of molybdenum.

References Cited by the Examiner
UNITED STATES PATENTS

| | | | |
|---|---|---|---|
| 2,000,494 | 5/1935 | Nordstrom | 137—246 |
| 2,003,840 | 6/1935 | Sorensen | 137—246.22 |
| 2,584,761 | 2/1952 | Volpin | 137—246.11 |
| 2,918,935 | 12/1959 | Ohls | 137—246.22 X |
| 2,923,310 | 2/1960 | Eckert | 137—246.13 |

WILLIAM F. O'DEA, *Primary Examiner.*

CLARENCE R. GORDON, *Examiner.*